United States Patent
Zhang et al.

(10) Patent No.: US 8,849,497 B2
(45) Date of Patent: Sep. 30, 2014

(54) VEHICLE HEALTH PROGNOSIS

(75) Inventors: Yilu Zhang, Northville, MI (US); Mutasim A. Salman, Rochester Hills, MI (US); Xiaofeng Mao, Warren, MI (US); Fan Bai, Ann Arbor, MI (US); Xinyu Du, Windsor (CA); Bo Yu, Warren, MI (US); Pulak Bandyopadhyay, Rochester Hill, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/409,915

(22) Filed: Mar. 1, 2012

(65) Prior Publication Data

US 2013/0231826 A1 Sep. 5, 2013

(51) Int. Cl.
  *G06F 7/00* (2006.01)
  *G06F 19/00* (2011.01)

(52) U.S. Cl.
  USPC ........ 701/29.3; 701/29.1; 701/31.4; 701/34.4

(58) Field of Classification Search
  None
  See application file for complete search history.

(56) References Cited

U.S. PATENT DOCUMENTS

| | | | |
|---|---|---|---|
| 2006/0025897 A1* | 2/2006 | Shostak et al. | 701/1 |
| 2009/0096597 A1* | 4/2009 | Avery et al. | 340/435 |
| 2009/0138141 A1* | 5/2009 | Nwadiogbu et al. | 701/3 |
| 2010/0179720 A1* | 7/2010 | Lin et al. | 701/33 |
| 2010/0228423 A1* | 9/2010 | Howell et al. | 701/29 |
| 2011/0090075 A1* | 4/2011 | Armitage et al. | 340/439 |
| 2011/0112969 A1* | 5/2011 | Zaid et al. | 705/50 |
| 2011/0130915 A1* | 6/2011 | Wright et al. | 701/32 |
| 2011/0224865 A1* | 9/2011 | Gordon et al. | 701/32 |
| 2011/0238259 A1* | 9/2011 | Bai et al. | 701/33 |
| 2011/0264318 A1* | 10/2011 | Laforge et al. | 701/22 |
| 2011/0307119 A1* | 12/2011 | Basir et al. | 701/1 |
| 2012/0041640 A1* | 2/2012 | Videtich et al. | 701/34.4 |
| 2012/0296567 A1* | 11/2012 | Breed | 701/468 |
| 2013/0141250 A1* | 6/2013 | Mathieu et al. | 340/901 |

* cited by examiner

*Primary Examiner* — James Trammell
*Assistant Examiner* — Demetra Smith-Stewart
(74) *Attorney, Agent, or Firm* — Pearl Cohen Zedek Latzer Baratz LLP

(57) ABSTRACT

A method includes collecting state of health (SOH) data and usage data from a plurality of vehicles. A peer group is identified among the vehicles. A vehicle health prognosis is generated for each vehicle of the peer based on the collected SOH and usage data. The vehicles of the peer group are ranked based on the generated vehicle health prognosis and the rank is reported to an output device that is associated with each vehicle or with a user of each vehicle. If evaluation of the ranking indicates that the health prognosis of a vehicle of the peer group is improvable by modifying vehicle usage, an alert is issued to a user of that vehicle.

14 Claims, 3 Drawing Sheets

VEHICLE HEALTH PROGNOSIS

BACKGROUND

Evaluation of the status or health of a vehicle or a vehicle system may contribute to effective operation and maintenance of the vehicle.

Accurate evaluation of vehicle health or vehicle system health may be of benefit to the owner or operator of the vehicle, as well as to other parties. For example, accurate evaluation may be utilized to reduce the possibility of vehicle failure or breakdown.

A vehicle may incorporate a communications system. Such a communications system may operate via an onboard communications device, or via a mobile device (e.g. mobile phone) that is connected to the vehicle. Such a communications system may be operated to provide vehicle-to-vehicle (V2V) communications or vehicle-to-infrastructure (V2I) communications. For example, such communications may be provided to inform a driver or a vehicle control system of hazards or conditions that are not currently directly detectable by the vehicle.

SUMMARY

A method includes collecting state of health (SOH) data and usage data from a plurality of vehicles. A peer group is identified among the vehicles. A vehicle health prognosis is generated for each vehicle of the peer based on the collected SOH and usage data. The vehicles of the peer group are ranked based on the generated vehicle health prognosis and the rank is reported to an output device that is associated with each vehicle or with a user of each vehicle. If evaluation of the ranking indicates that the health prognosis of a vehicle of the peer group is improvable by modifying vehicle usage, an alert is issued to a user of that vehicle.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
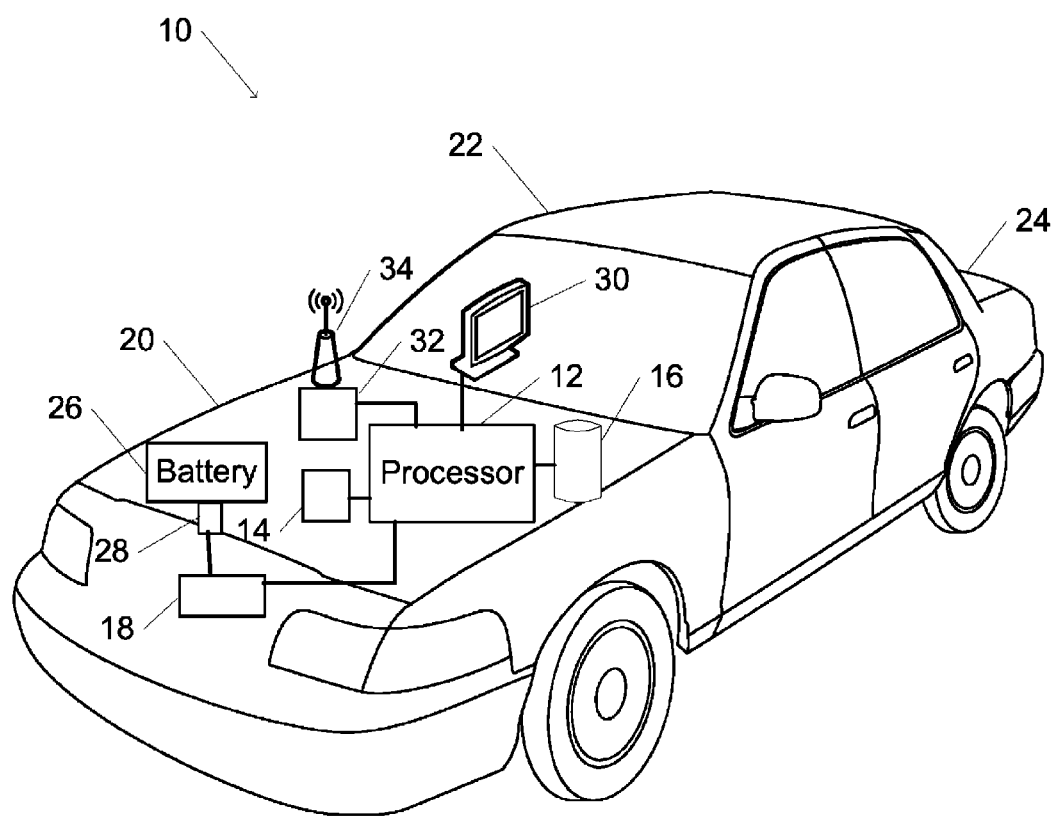
FIG. 1 is a schematic diagram of a vehicle configured for vehicle health prognosis, in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. It will however be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Vehicle health prognosis, in accordance with an embodiment of the present invention, utilizes vehicle communications in conjunction with data obtained from a plurality of vehicles. For example, the plurality of vehicles may include vehicles that subscribe to a service for providing a vehicle health prognosis, or for otherwise monitoring vehicle status.

Data may be acquired from each of the vehicles via vehicle communications. For example, the data may be acquired via a network via which vehicles may communicate with one another, or with a server or other processor at a central location. The data may relate to a state of health (SOH) of each of the vehicles, or of one or more individual systems or components of each vehicle. For example, each vehicle of the plurality may be provided with one or more sensors that sense an SOH of the vehicle, or of a vehicle system or component. Acquired data may also relate to a usage of each of the vehicles, or of one or more individual systems or components of each vehicle. For example, each vehicle may be further provided with one or more sensors that sense a pattern of usage of the vehicle, or of a vehicle system or component.

Data that is acquired via vehicle communications may be analyzed to generate a prediction of a future state (prognosis) of each of the vehicles, or for one or more individual systems or components of each vehicle. For example, the prognosis may be based on a detected current SOH of the vehicle or of a vehicle system or component, as well as on a predicted future SOH that is based on usage data for that vehicle. A model of vehicle health may be utilized to calculate a vehicle health prognosis such as a predicted remaining useful life of a component or system of the vehicle, or a predicted residual value of the vehicle. For example, a residual value may be predicted based on a representative sales price of a used vehicle with similar SOH (or remaining useful life).

A subset of the vehicles (the "peer group" of vehicles) may be identified. The generated prognoses of the various vehicles of the peer group may be compared with one another. For example, vehicles of the peer group may be identified as being sufficiently similar to one another such that comparing prognoses related to various vehicles of the peer group may be expected to be useful. (A prognosis for a vehicle as used herein may refer to a prognosis that relates to a vehicle, to a particular component of the vehicle, or to a particular system or subsystem of a vehicle.) For example, the vehicles of the peer group, or a system or component of each of the vehicles of the peer group, may be characterized by one or more common or similar characteristics. The characteristics may relate to the vehicle itself, to components or systems of the vehicle, or to characteristics that relate to a user (e.g. driver, manager, or owner) of the vehicle.

The processor may incorporate data that is received from the plurality of vehicles into vehicle database.

For example, vehicle health prognosis may provide a prognosis regarding a vehicle battery. A processor associated with a vehicle health prognosis system may collect battery-related data from a plurality of vehicles. Battery-related data may include, for example, data that is related to internal resistance of a vehicle battery and that is related to a capacity of the current battery. In addition, data may be collected that is related to vehicle usage that relates to battery health. For example, vehicle usage data may include data related to battery usage, such as a history of charging and discharging cycles of the battery. In particular, usage that is known to be potentially detrimental to battery health may be detected. Such potentially detrimental usage may include excessive ignition-off load (operation of electrical systems that draw electrical power from the battery when the vehicle's engine is not running and not recharging the battery), excessively frequent short trips, and excessive ignition-off time (periods of time when the vehicle engine is not running). Some of such acquired data may be representable in the form of a histogram (which may be multidimensional). For example, incidents of ignition-off load may be summarized in the form of a histogram that shows the number of times the battery was providing electrical power when the vehicle engine was turned off, binned by magnitude of battery current (or power) and by length of time. Similarly, trip duration (related to determining frequency of short trips) may be representable as a histogram of number of trips binned by trip length. Ignition-off time may be similarly represented in the form of a histogram of frequency binned by length of ignition-off time.

Vehicles of the peer group may be ranked, based at least partly on the prognosis for each vehicle. For example, a prognosis-based indicator, such as component lifetime or a residual value, for a higher-ranked vehicle may be greater than the same indicator for a lower-ranked vehicle.

A low relative ranking (e.g. as compared with a predetermined percentile ranking) for a vehicle may indicate that a change or modification of usage of that vehicle may improve the generated prognosis for that vehicle. Since the membership of a vehicle in a peer group is based on one or more common characteristics, a relative low ranking for one vehicle may be indicative that another vehicle that shares similar characteristics with that vehicle was able to achieve a better prognosis.

If the prognosis for a vehicle is ranked low in comparison with the prognoses for other vehicles of the peer group, modification of vehicle usage may be indicated. For example, if a predicted battery useful lifetime for a vehicle of the peer group may be shorter than the predicted battery lifetimes for other vehicle of the batteries of the peer group. Further analysis may determine that the shorter lifetime is due to one or more patterns of usage of that vehicle (e.g. frequent short trips, long periods without running the engine, or large ignition off load).

On the other hand, if analysis of vehicle usage shows that all vehicles of the peer group are being used in a manner close to optimum, a low ranking of a vehicle may be ignored (e.g. as representing a statistical fluctuation).

If modification of usage of a vehicle is indicated, an alert may be issued. For example, the alert may be sent to a device that is associated with the vehicle or with a user of the vehicle. The device may display or otherwise report the alert in a manner that is detectable by the user.

For example, if the prognosis for a vehicle battery is ranked low (e.g. low predicted battery lifetime), an alert may indicate the low ranking, and may indicate a recommended modification in usage (e.g. reduce the frequency of short trips or of long periods when the vehicle is parked and not operated, or to avoid operating electrical systems of the vehicle with the engine of the vehicle is off).

A report may be issued with regard to each vehicle of the peer group. The report may include a prognosis for the vehicle (e.g. for various components or subsystems of the vehicle) and a summary of usage of the vehicle. The report may also include the ranking of each vehicle within the peer group.

Vehicle health prognosis in accordance with embodiments of the present invention may be advantageous. A ranking of vehicle prognoses within the peer group may be useful in persuading a vehicle user to modify usage of the vehicle in order to achieve an improved prognosis. Since the vehicles of the peer group, or users of vehicles of the peer group share common characteristics, a user may be more readily persuaded that the low ranking is the result of usage and not due to differences among the vehicles. Reporting of particular usage patterns that contribute to deterioration of vehicle health may be especially and effective in guiding the driver of the vehicle.

FIG. 1 is a schematic diagram of a vehicle configured for vehicle health prognosis, in accordance with an embodiment of the present invention.

A vehicle 10 (e.g., a car, or any other type of land, aquatic, or flying vehicle) may include a processor 12. Processor 12 may operate in conjunction with or separate from vehicle monitoring system 18.

Processor 12 may include one or more processing units, e.g. of one or more computers incorporated in vehicle 10, connected to vehicle 10, or remotely located. Processor 12 may be configured to operate in accordance with programmed instructions stored in memory 14. Processor 12 may be capable of operating in accordance with the programmed instructions so as to execute an application or module for vehicle health prognosis.

Processor 12 may communicate with memory 14. Memory 14 may include one or more volatile or nonvolatile memory devices. Memory 14 may be utilized to store, for example, programmed instructions for operation of processor 12, data or parameters for use by processor 12 during operation, results of operation of processor 12, or sensor data from vehicle monitoring systems 18.

Processor 12 may communicate with data storage device 16. Data storage device 16 may include one or more fixed or removable nonvolatile data storage devices. For example, data storage device 16 may include a computer readable medium for storing program instructions for operation of processor 12. Such instructions may include, for example, instructions for one or more operations or modules related to vehicle health prognosis. Data storage device 16 may be utilized to store data or parameters for use by processor 12 during operation, results of operation of processor 12, or sensor or other data received from one or more vehicle monitoring systems 18 or from a remote vehicle monitoring system on a remote vehicle.

Data storage device 16 may represent a data storage device that is remote from processor 12. For example, data storage device 16 may represent a storage device of a remote server in the form of an installation package or packages that can be downloaded and installed for execution by processor 12.

Processor 12 may communicate with a processor on another vehicle or with a server or remote processor via communications module 32 and communications device 34. For example, communications module 32 may be configured for vehicle-to-vehicle (V2V communications), vehicle-to-infrastructure (V2I) communications, or communications with a remote device. Communications device 34 may include a wireless device with a capability for line of sight communications (e.g. via visible or infrared radiation), or radio frequency or microwave communications. Communications device 34 may include a component capable of being connected via a wire or connector to a device via which communications device 34 may communicate with another processor or device.

Processor 12 may communicate with vehicle monitoring system 18. For example, processor 12 may be configured to query vehicle monitoring system 18 and to receive sensor data from one or more sensors that are associated with vehicle monitoring system 18. Vehicle monitoring system 18 may include analog or digital processing circuitry or capability for performing processing operations on sensor data (e.g. calibration or conversion) prior to communicating acquired sensor data to vehicle monitoring system 18.

For example, vehicle monitoring system 18 may monitor data that is related to vehicle health or to vehicle usage. Vehicle usage may include a distance traveled, logging of periods during which an engine of the vehicle is turned off or on, when the vehicle is moving, when the vehicle is idling, or when one or more systems of the vehicle are operating.

For example, vehicle monitoring system 18 may be associated with one or more battery sensors 28. Battery sensors 28 may be configured to sense a state or activity associated with vehicle battery 26. For example, battery sensor 28 may sense a quantity that is related to a state of charging or discharging, or a capacity (stored charge) of vehicle battery 26. Vehicle monitoring system 18 may query battery sensor 28 or receive sensed data from battery sensor 28.

One or more components of processor 12, memory 14, data storage device 16, communications module 32, communications device 34, or vehicle monitoring system 18 may be include, incorporated into, or mounted on or in an engine compartment 20, a passenger compartment 22 (e.g. in a dashboard or other interior panel, or in a portable computer, mobile phone, or smart phone that is carried in passenger compartment 22), or baggage compartment 24 (e.g. a trunk) of vehicle 10.

In accordance with an embodiment of the present invention, a vehicle 10 may cooperate with a system for vehicle health prognosis. For example, processor 12 of vehicle 10 may communicate via communications module 32 and communications device 34 with one or more other vehicles, or with a remote server or other remote device.

An alert regarding a vehicle health prognosis, or other data related to a vehicle health prognosis, SOH, or usage, may be reported. For example, a report may be reported via output device 30. Output device 30 may represent a device for displaying visual output (e.g. a screen, monitor, or display panel), for providing audio output (e.g. a speaker or headphone), or tactile output. Output device 30 may be associated with a vehicle (e.g. of an onboard computer, navigation system, dashboard display, or of a portable device that is temporarily mounted in the vehicle), or with a user (e.g. driver, passenger, manager or supervisor, or owner) that is associated with a vehicle, whether or not the user is in or near the vehicle.

Figure 2:
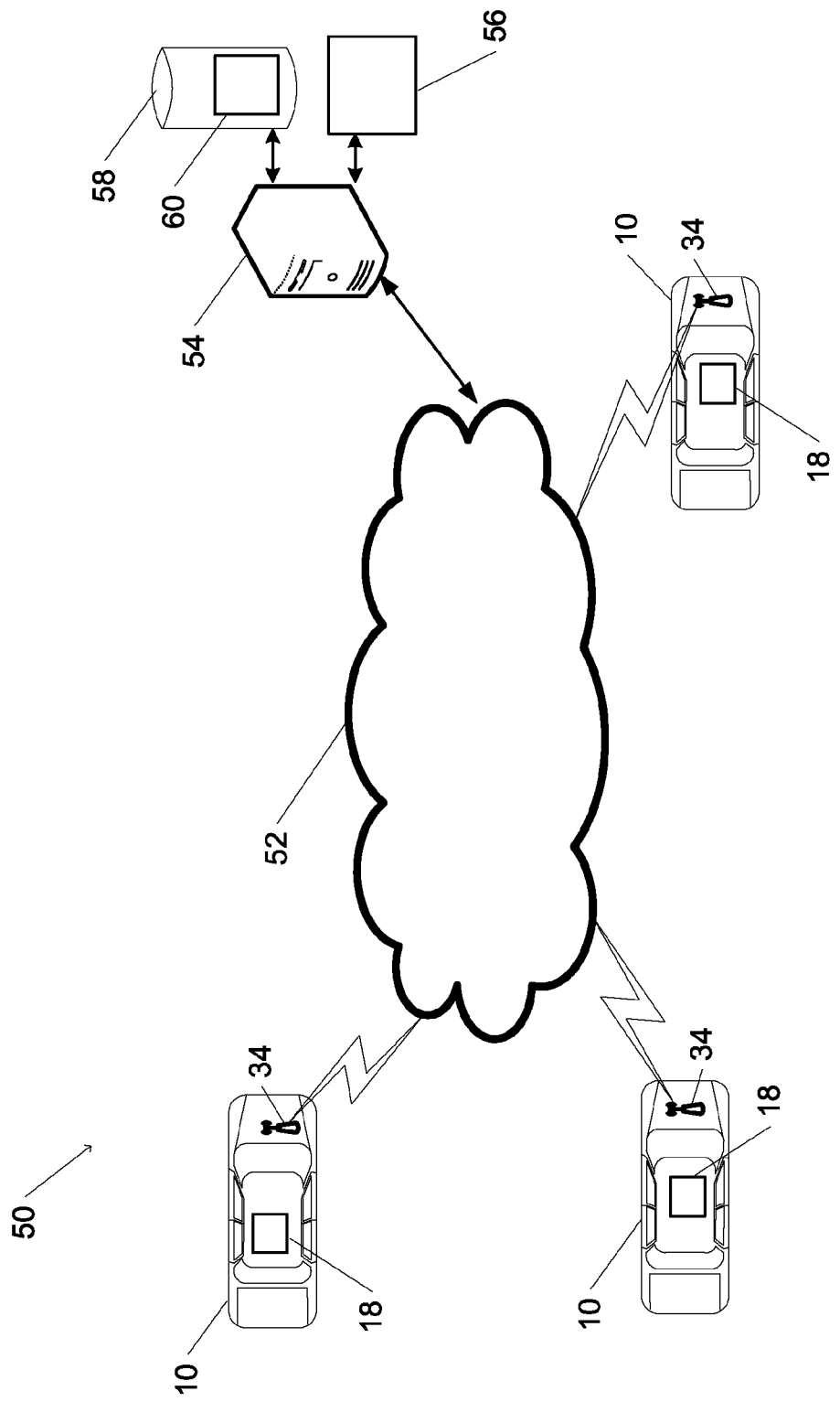
FIG. 2 is a schematic diagram of a system for vehicle health prognosis, in accordance with an embodiment of the present invention.

FIG. 2 is a schematic diagram of a system for vehicle health prognosis, in accordance with an embodiment of the present invention.

In vehicle health prognosis system 50, vehicles 10 communicate with network 52. For example, network 52 may represent any combination of communications paths or networks. Such communications paths or networks may include, for example, the Internet, a mobile phone network, V2V communications, V2I communications, or wireless access to a network. A vehicle 10 includes at least a vehicle monitoring system 18 for monitoring one or more sensors in current vehicle 10, and a communications device 34 for communicating via network 52. A vehicle 10 that is associated with collaborative vehicle health system 50 may include a subgroup of all vehicles that are equipped with a vehicle monitoring system 18 and a communications device 34. For example, such a subgroup may include those vehicles that subscribe to a vehicle health prognosis service.

A vehicle 10 may communicate with server 54 via network 52. Server 54 may include processing functionality in the form of one or more processors, computers, or other devices with processing capability. For example, processing functionality of server 54 may be included in one or more remote stationary computing devices, or in one or more intercommunicating vehicle-mounted devices. For example, processing functionality of server 54 may be included in a processor 12 (FIG. 1) of one or more of vehicles 10.

A processor of server 54 may communicate with server memory 56. Server memory 56 may represent one or more local or remote memory devices that may communicate with server 54.

A processor of server 54 may communicate with server data storage device 58. Server data storage device 58 may represent one or more local or remote non-volatile data storage devices that may communicate with server 54. For example, some or all of the data storage functionality of server data storage device 58 may be located in one or more of vehicles 10.

Server data storage device 58 may be used to store database 60. For example, database 60 may include data that is collected from a vehicle monitoring system 18 of one or more of vehicles 10.

Server 54 may be operated to execute a method for vehicle health prognosis, in accordance with an embodiment of the present invention. Execution of the method for vehicle health prognosis may result in generation or updating of a vehicle health prognosis for predicting the health of a vehicle, or of a vehicle system or component. The prediction or indication may be calculated from a vehicle health model on the basis of measured parameters related to usage of a vehicle, or of a vehicle system or component.

Figure 3:
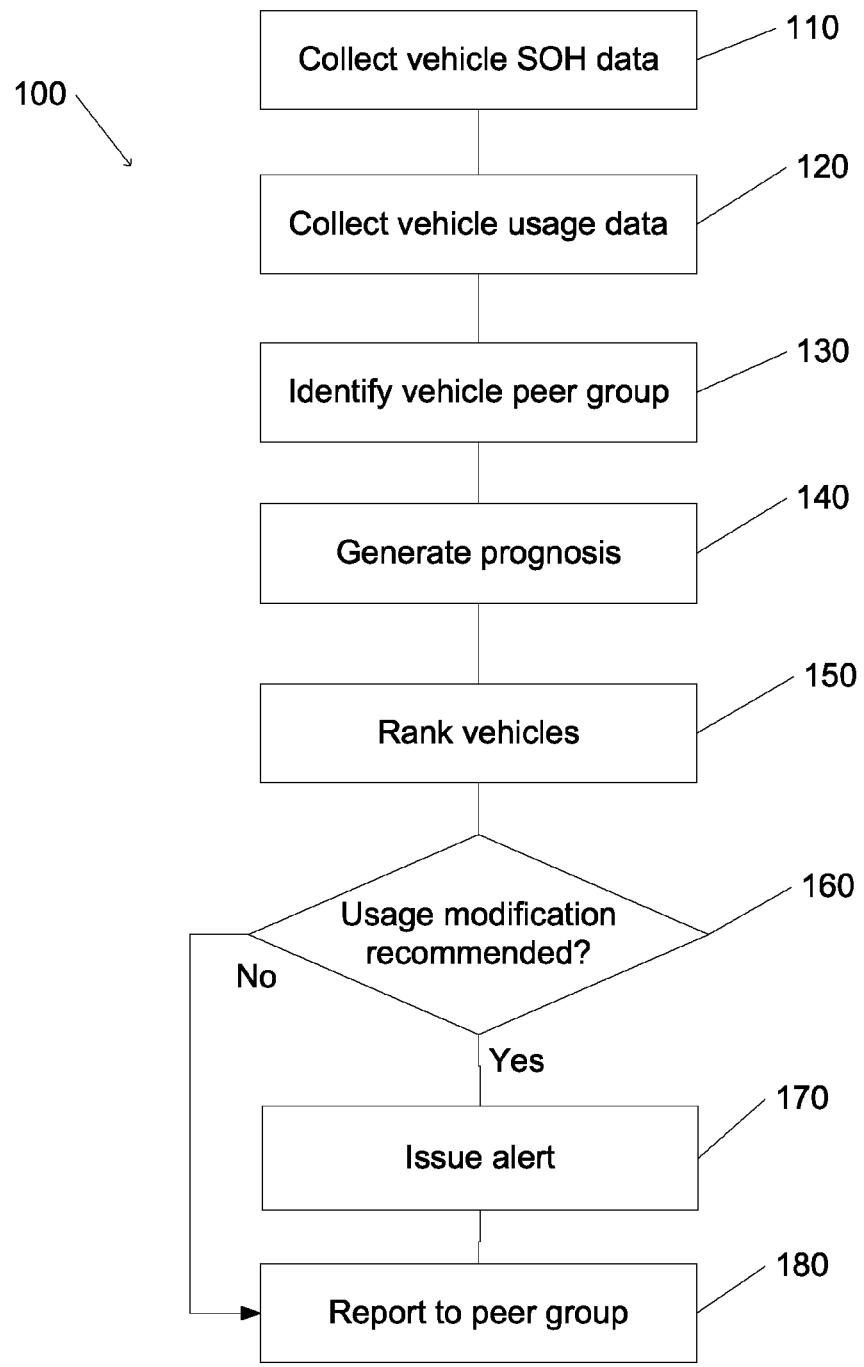
FIG. 3 is a flowchart of a method for vehicle health prognosis, in accordance with an embodiment of the present invention.

FIG. 3 is a flowchart of a method for vehicle health prognosis, in accordance with an embodiment of the present invention.

It should be understood that the division of the method illustrated by the flowchart into separate operations, each represented by a block of the flowchart, has been selected for convenience and clarity only. Alternative division of the illustrated method into operations is possible with equivalent results. Such alternative division of the method into operations should be considered as included within the scope of embodiments of the present invention.

It should also be understood that, unless indicated otherwise, the illustrated order of operations as represented by blocks of the flowchart has been selected for the sake of convenience and clarity only. The order of execution of illustrated operations may be modified, or operations of the illustrated method may be executed concurrently, with equivalent results. Such reordering of operations illustrated by blocks of the flowchart should be considered as included within the scope of embodiments of the present invention.

Vehicle health prognosis method 100 may be executed by a processor of a vehicle health prognosis system, such as a server (e.g. at a fixed location) or a vehicle onboard computer. For example, vehicle health prognosis method 100 may be executed continuously, at predetermined intervals, as indicated by one or more sensed conditions, or when initiated by a human operator. For example, one or more operations of vehicle health prognosis method 100 may be executed periodically in order to generate a vehicle health prognosis as a vehicle is operated.

Data related to an SOH of a vehicle, or an SOH of a vehicle system or component, may be collected from each vehicle of a group of vehicles (block 110). The data may include data from various sensors of each vehicle. The sensors may indicate a current state of one or more vehicle systems. For example, the sensors may indicate a current charge of a battery, or a current thickness of a brake pad.

For example, the group of vehicles may include all vehicles that are capable of communicating with a processor, such as a server or vehicle onboard computer, that is configured to execute vehicle health prognosis method 100. Each vehicle may communicate via a wireless or other network, or via another communications channel, with the processor. The group of vehicles may be limited to those vehicles that subscribe to a service, or that are otherwise enabled to communicate data related to vehicle SOH to the processor.

Communicated vehicle SOH data may be saved, for example, in a database. The database may be located at a single location, e.g. in one or more data storage devices that are associated with a server, or may be distributed among intercommunicating devices (e.g. devices that are associated with vehicle onboard processors).

Similarly, data related to vehicle usage may be collected from the vehicles (block 120). Vehicle usage data may indicate a pattern of usage of the vehicle. For example, vehicle usage data may relate to how the vehicle is driven, and how various system or accessories of the vehicle are used. For example, usage data that is related to a battery may include data related to charging and discharging of the battery (e.g. engine operation and operation of electrical accessories and systems). Usage data that is related to brake usage may include data related to application of the brakes (e.g. how often and what deceleration rates). Collected usage data may be saved in a database (e.g. the same database that is used to same collected SOH data).

A subset of the group of vehicles may be identified as being members of a peer group of vehicles (block 130). The peer group of vehicles may be selected as specific to vehicle health prognosis for a particular vehicle system or component (e.g. a battery). A peer group for vehicle health prognosis with regard to another different vehicle system or component (e.g. a braking system) may include a different subset of the group of vehicles.

The peer group may be defined by one or more common characteristics. For example, such a peer group may include all vehicles that include a single type of component or system (e.g. type of battery). A single type of component or system may be characterized by having, for example, a common engine, model number, year of manufacture, or other characteristics. The peer group may be limited to those vehicles that are similar to one another. For example, a group of similar vehicles may be characterized by vehicles having a common or similar type, make, model, year of manufacture, or engine type. The peer group may be limited to those vehicles that are subject to similar environmental conditions, e.g. operating in the same or similar geographic areas or climate zones. The peer group may be limited to those vehicles that are operated under similar operational conditions, e.g. being either privately owned or owned by a company or fleet, or being primarily designated for family use or for commercial use. The peer group may be selected on a social basis (e.g. drivers or owners of vehicles of the peer group being residents of a common neighborhood, or members of a common organization) or any other basis. (Since identifying the peer group may identify those vehicles to which a ranking is likely to be significant to a vehicle user, the selection of the peer group need not depend solely on vehicle characteristics.)

Collected vehicle SOH data and usage data may be analyzed to generate a vehicle prognosis for each vehicle (block 140). The vehicle prognosis may be in the form of a score or other indicator that is indicative of a predicted future SOH of each vehicle, or of a particular component or system of each vehicle. For example, a battery prognosis may be indicated by a predicted remaining useful life of the battery. A vehicle prognosis may be indicated by an estimated residual value of the vehicle.

A prognosis, such as an estimated remaining useful life of a vehicle component system (e.g. a battery or braking system), may be based on collected SOH data in combination with collected usage data. For example, a prognosis may be based on a current SOH with a future SOH being estimated on the basis of usage data. Similarly, an estimated residual value of a vehicle may be based on vehicle SOH in combination with vehicle usage data.

The vehicles of the peer group may be ranked or otherwise graded relative to one another based on the vehicle prognosis (block 150). For example, vehicles of the peer group may be ranked relative to one another based on an estimated residual value of the vehicle. A component or system of a vehicle (e.g. a battery or braking system) may be ranked in accordance with an estimated total lifetime of the component or system (e.g. age of battery plus estimated remaining life).

A relative ranking of a vehicle, or of a vehicle component or system, may indicate that a modification of usage is recommended (block 160). For example, evaluation of usage data may indicate that a modification of the usage pattern of the vehicle may improve the ranking of the vehicle (e.g. be beneficial for a predicted future vehicle SOH). (In other cases, it may be determined that a modification in vehicle usage may not significantly improve vehicle SOH, e.g. if vehicle usage is close to optimal.) In accordance with some embodiments of the present invention, such a recommendation may be limited to those vehicles whose ranking is lower than a predetermined fraction of the peer group (e.g. low percentile ranking).

For example, if the ranking of a vehicle battery within the peer group is low (e.g. the battery is degrading rapidly), and if evaluation of vehicle usage indicates that vehicle usage is not optimal (e.g. frequent short trips, long ignition-off time, large ignition-off load), corrective action may be indicated.

If corrective action is recommended, an alert may be issued (block 170). The alert may include, or refer to, a suggested modification of current usage so as to achieve an improved prognosis, or ranking, of the vehicle within the peer group. For example, a suggested modified usage to extend battery life may include reducing a frequency of short trips, operating the vehicle more often, or avoiding operation of electrical systems of the vehicle when the vehicle engine is not running.

The alert may be communicated to an output device that is associated with the vehicle or with a user of the vehicle. For example, a visual representation of the report may be displayed on a display screen that is on board a vehicle, or on a screen (e.g. of a mobile phone or of a computer) that is associated with a user of the vehicle. The report may be sent in the form of a document, message, or email to a device that is associated with the vehicle or the user of the vehicle. An audible tone or message may be generated in addition to, or instead of, a displayed alert.

Whether or not an alert is issued, a report may be generated and communicated to the peer group (block 170). A report may include, for example, an indication of a SOH (of a vehicle, component, or system). For example, the indication of SOH may be indicated as a percentage or fraction of an optimum SOH. The report may include an estimated residual value of the vehicle. For example, the residual value may be based on a representative (e.g. average or median) resale value of a similar vehicle with a similar SOH. The report may include one or more indications of usage of the vehicle. For example, the report may indicate which usage patterns of the vehicle are beneficial or detrimental to vehicle health. A usage pattern report may compare (e.g. as a fraction or percentage) a current usage pattern with the most beneficial type of usage pattern. The report with regard to each vehicle of the peer group may indicate a ranking of that vehicle in comparison with other vehicles of the peer group. For example, a ranking may indicate a position of that vehicle within a ranked list of all of the vehicles of the peer group.

A report may be communicated to an output device that is associated with a vehicle, or with a user (e.g. driver, administrator, or owner) that is associated with the vehicle.

An alert with regard to a recommended modification of vehicle usage may be incorporated into a communicated report, or may be communicated separately or as part of a separate report.

Various operations of vehicle health prognosis method 100 may be executed at different times or with different periodicity. For example, an operation of collecting SOH or usage data from vehicles (blocks 110 and 120) may be executed more often than an operation of generating or updating an alert or a report (blocks 170 and 180).

A periodicity for collecting data from vehicles, or for generating reports, may vary for different vehicle systems.

Other or different series of operations may be used.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EE-PROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method comprising:
using a processor linked with a network to:
collecting state of health (SOH) data related to vehicle SOH from a plurality of vehicles;
collect usage data related to vehicle usage from the plurality of vehicles;
identify a peer group among the plurality of vehicles;
generate a vehicle health prognosis for each vehicle of the peer group based on the SOH and the usage data;
define a ranking for each of the vehicles of the peer group based on the vehicle health prognosis for each of the vehicles of the peer group;
report the ranking through an output device associated with a respective vehicle of the peer group or with a its user, the output device selected from the group consisting of visual output device, audio output device, and tactile output device; and
issue an alert through the output device associated with any of the vehicles of the peer group whose future state of health being improvable through vehicle usage modification.

2. The method of claim 1, wherein identifying the peer group comprises identifying vehicles of the plurality of vehicles characterized by a predefined set of one or more characteristics.

3. The method of claim 2, wherein the predefined set of characteristics comprises a characteristic of a component of the vehicle.

4. The method of claim 1, wherein the vehicle health prognosis comprises an estimate of a residual value of the vehicle.

5. The method of claim 4, further comprising reporting the estimated residual value of each vehicle of the peer group to the output device.

6. The method of claim 1, wherein generating a vehicle health prognosis comprises applying a vehicle health model.

7. The method of claim 1, wherein the SOH data comprises data related to a component or system of the vehicle.

8. A system for evaluating vehicular health, the system comprising:
a processor linked with a network, the processor configured to:
collect data related to a vehicle state of health (SOH) from a plurality of vehicles;
collect data related to vehicle usage from the plurality of vehicles; identify a peer group among the plurality of vehicles;
generate a vehicle health prognosis for each vehicle of the peer group based on the collected S0H and the usage data;
define a ranking of each of the vehicles of the peer group on a basis of the generated vehicle health prognosis for each of the vehicles of the peer group;
report the ranking to an output device associated with a respective vehicle of the peer group or with its user, the output device selected from the group consisting of visual output device, audio output device, and tactile output device; and
issue an alert through the output device associated with any of the vehicles of the peer group whose future state of health being improvable through vehicle usage modification.

9. The system of claim 8, wherein the network is a wireless network.

10. The system of claim 8, wherein the processor is associated with a server of the network.

11. The system of claim 8, wherein the peer group comprises vehicles of the plurality of vehicles that are characterized by a predefined set of characteristics.

12. The system of claim 11, wherein the predefined characteristics include a characteristic of a component of the vehicle.

13. A non-transitory computer readable storage medium having stored thereon instructions that when executed by a processor will cause the processor to perform a method of:
- collecting state of health (SOH) data related to vehicle SOH from a plurality of vehicles;
- collecting usage data related to vehicle usage from the plurality of vehicles;
- identifying a peer group among the plurality of vehicles;
- generating a vehicle health prognosis for each of the vehicles of the peer group based on the collected SOH and usage data;
- define a ranking for each of the vehicles of the peer group based on the vehicle health prognosis for each of the vehicles of the peer group;
- reporting the ranking through an output device associated with a respective vehicle of the peer group or with its user, the output device selected from the group consisting of visual output device, audio output device, and tactile output device of that vehicle; and
- issuing an alert through the output device associated with any of the vehicles of the peer group whose future state of health being improvable through vehicle usage modification.

14. The non-transitory computer readable medium of claim 13, wherein identifying the peer group comprises identifying vehicles of the plurality of vehicles that are characterized by a predefined set of characteristics.

* * * * *